United States Patent
Clark

(10) Patent No.: US 10,060,741 B2
(45) Date of Patent: Aug. 28, 2018

(54) TOPOLOGY-BASED DATA GATHERING

(71) Applicant: Kespry, Inc., Menlo Park, CA (US)

(72) Inventor: Robert Parker Clark, Palo Alto, CA (US)

(73) Assignee: Kespry Inc., Menlo Park, CA (US)

( * ) Notice: Subject to any disclaimer, the term of this patent is extended or adjusted under 35 U.S.C. 154(b) by 0 days.

(21) Appl. No.: 15/360,681

(22) Filed: Nov. 23, 2016

(65) Prior Publication Data

US 2017/0146344 A1 May 25, 2017

Related U.S. Application Data

(60) Provisional application No. 62/258,917, filed on Nov. 23, 2015.

(51) Int. Cl.
| | |
|---|---|
| *G05D 1/00* | (2006.01) |
| *G01C 7/04* | (2006.01) |
| *B64C 39/02* | (2006.01) |
| *G06K 9/00* | (2006.01) |
| *H04N 7/18* | (2006.01) |

(Continued)

(52) U.S. Cl.
CPC ............. *G01C 7/04* (2013.01); *B64C 39/024* (2013.01); *G05D 1/0094* (2013.01); *G06K 9/0063* (2013.01); *H04N 7/183* (2013.01); *B64C 2201/024* (2013.01); *B64C 2201/108* (2013.01); *B64C 2201/123* (2013.01);

(Continued)

(58) Field of Classification Search
CPC . G06T 3/00; H04N 1/387; H04N 7/18; G05D 1/00; B64C 3/38

USPC ............................................................ 701/3
See application file for complete search history.

(56) References Cited

U.S. PATENT DOCUMENTS

| | | | |
|---|---|---|---|
| 8,019,490 B2 * | 9/2011 | Ferren | G05D 1/0676 |
| | | | 701/3 |
| 8,401,222 B2 | 3/2013 | Thornberry et al. | |

(Continued)

FOREIGN PATENT DOCUMENTS

| | | |
|---|---|---|
| CN | 205353774 U | 6/2016 |
| EP | 2 881 827 A1 | 6/2015 |

(Continued)

OTHER PUBLICATIONS

Beard, Randal, et al. "Cooperative Forest Fire Surveillance Using a Team of Small Unmanned Air Vehicles." (2006) *All Faculty Publications*. Paper 1228.

(Continued)

*Primary Examiner* — Tan Q Nguyen
(74) *Attorney, Agent, or Firm* — Veros Legal Solutions, LLP

(57) ABSTRACT

Topology based adaptive data gathering is disclosed herein. Payload data gathering by an unmanned aerial vehicle can be adjusted based on topological or topographical characteristics of the area of flight by the unmanned aerial vehicle. The unmanned aerial vehicle collects payload data over an area and may scale up the rate of payload data gathering or slow down the flight as the unmanned aerial vehicle flies over a high or complex structure. Conversely, the unmanned aerial vehicle may advantageously scale down the rate of payload data gathering or speed up the flight as the unmanned aerial vehicle flies over a simple structure or an empty area.

21 Claims, 3 Drawing Sheets

(51) Int. Cl.
  *B64C 3/38* (2006.01)
  *B64D 31/06* (2006.01)
(52) U.S. Cl.
  CPC .. *B64C 2201/141* (2013.01); *B64C 2201/165* (2013.01); *B64D 31/06* (2013.01)

(56) References Cited

U.S. PATENT DOCUMENTS

| | | | |
|---|---|---|---|
| 8,902,308 B2 | 12/2014 | Rinner et al. | |
| 8,930,044 B1 | 1/2015 | Peeters et al. | |
| 2009/0015674 A1* | 1/2009 | Alley | G01C 11/025 348/144 |
| 2010/0084513 A1* | 4/2010 | Gariepy | B64C 39/024 244/190 |
| 2010/0100269 A1 | 4/2010 | Ekhaguere et al. | |
| 2010/0110074 A1 | 5/2010 | Pershing | |
| 2010/0114537 A1 | 5/2010 | Pershing | |
| 2012/0044710 A1* | 2/2012 | Jones | B64C 39/024 362/470 |
| 2014/0018979 A1* | 1/2014 | Goossen | G08G 5/0034 701/3 |
| 2014/0025229 A1 | 1/2014 | Levien et al. | |
| 2015/0254738 A1 | 9/2015 | Wright, III et al. | |
| 2016/0070265 A1* | 3/2016 | Liu | B64C 39/024 701/3 |
| 2016/0179096 A1 | 6/2016 | Bradlow et al. | |

FOREIGN PATENT DOCUMENTS

| | | |
|---|---|---|
| JP | 2008-186145 A | 8/2008 |
| WO | WO 2007/124014 A2 | 11/2007 |
| WO | WO 2012/175592 A1 | 12/2012 |
| WO | WO 2013/141922 A2 | 9/2013 |
| WO | WO 2016/015943 A1 | 2/2016 |

OTHER PUBLICATIONS

Elfes, Alberto. "Using Occupancy Grids for Mobile Robot Perception and Navigation." *Computer* 22.6 (1989): 46-57.

Hornung, Armin, et al. "OctoMap: An Efficient Probabilistic 3D Mapping Framework Based on Octrees." *Autonomous Robots* Preprint (2013): 1-17.

Pesti, Peter, et al. "Low-Cost Orthographic Imagery." *Proceedings of the 16th ACM SIGSPATIAL international conference on Advances in geographic information systems*. ACM, 2008.

Pike, R. J., et al. "Geomorphometry: a brief guide." *Developments in Soil Science* 33 (2009): 3-30.

Souza, Anderson AS, et al. "3D Probabilistic Occupancy Grid to Robotic Mapping with Stereo Vision." *INTECH Open Access Publisher*, (2012): 181-198.

Vandeportaele, Bertrand, et al. "Orient-Cam, a camera that knows its orientation and some applications." *Progress in Pattern Recognition, Image Analysis and Applications* (2006): 267-276.

Yahyanejad, Saeed, et al. "Incremental Mosaicking of Images from Autonomous, Small-Scale UAVs." *Advanced Video and Signal Based Surveillance (AVSS), 2010 Seventh IEEE International Conference on*. IEEE, 2010.

International Search Report and Written Opinion dated Feb. 20, 2017, received in PCT/US2016/063669 filed Nov. 23, 2016.

* cited by examiner

TOPOLOGY-BASED DATA GATHERING

RELATED APPLICATION

This application claims the benefit under 35 U.S.C. § 119(e) of U.S. Provisional Application No. 62/258,917, filed Nov. 23, 2015, the entirety of which is hereby incorporated by reference.

BACKGROUND

Field

The described technology generally relates to autonomous data gathering by an autonomous or semi-autonomous vehicle.

Description of the Related Art

An autonomous or semi-autonomous vehicle, such as unmanned aerial vehicle, also commonly referred to as drone, can travel through a variety of environments, such as indoor, outdoor, and/or mixed indoor and outdoor environments. In some cases, an autonomous or semi-autonomous vehicle can be configured to conduct surveillance, security, delivery, monitoring, or other tasks that can comprise combining movement and data collection. As the vehicle performs its missions, it can travel according to a flight plan.

SUMMARY

The methods and devices of the described technology each have several aspects, no single one of which is solely responsible for its desirable attributes.

In one embodiment, an unmanned aerial vehicle comprises a camera configured to generate photographic images, one or more sensors configured to generate sensor data and one or more processors configured to during a flight, estimate topology along at least a portion of a flight path based at least in part on the generated sensor data, detect a change in the estimated topology, and change the rate at which photographic images are generated and/or processed based at least in part on the detected change in the estimated topology.

In another implementation, an unmanned aerial vehicle comprises one or more sensors configured to generate sensor data and payload data, memory storing the payload data and one or more processors configured to estimate topology along at least part of a flight path based at least in part on the sensor data and adjust the rate at which payload data is generated based at least in part on the estimated topology.

In another implementation, an unmanned aerial vehicle comprises one or more sensors configured to generate payload data and sensor data, memory storing the payload data, and one or more processors configured to during a flight, estimate a topology along at least a portion of a flight path based at least in part on the generated sensor data, detect a change in the estimated topology, and change a velocity of the unmanned aerial vehicle based at least in part on the detected change in the estimated topology.

In another implementation, a method of adaptive data gathering for an autonomous aerial vehicle comprises generating sensor data, generating payload data, storing the payload data, estimating a topology along at least a portion of a flight path based at least in part on the sensor data, and adjusting the generation of payload data based at least in part on the estimated topology so as to reduce a total size of the stored payload data.

BRIEF DESCRIPTION OF THE DRAWINGS

These drawings and the associated description herein are provided to illustrate specific embodiments of the described technology and are not intended to be limiting.

DETAILED DESCRIPTION

Figure 1:
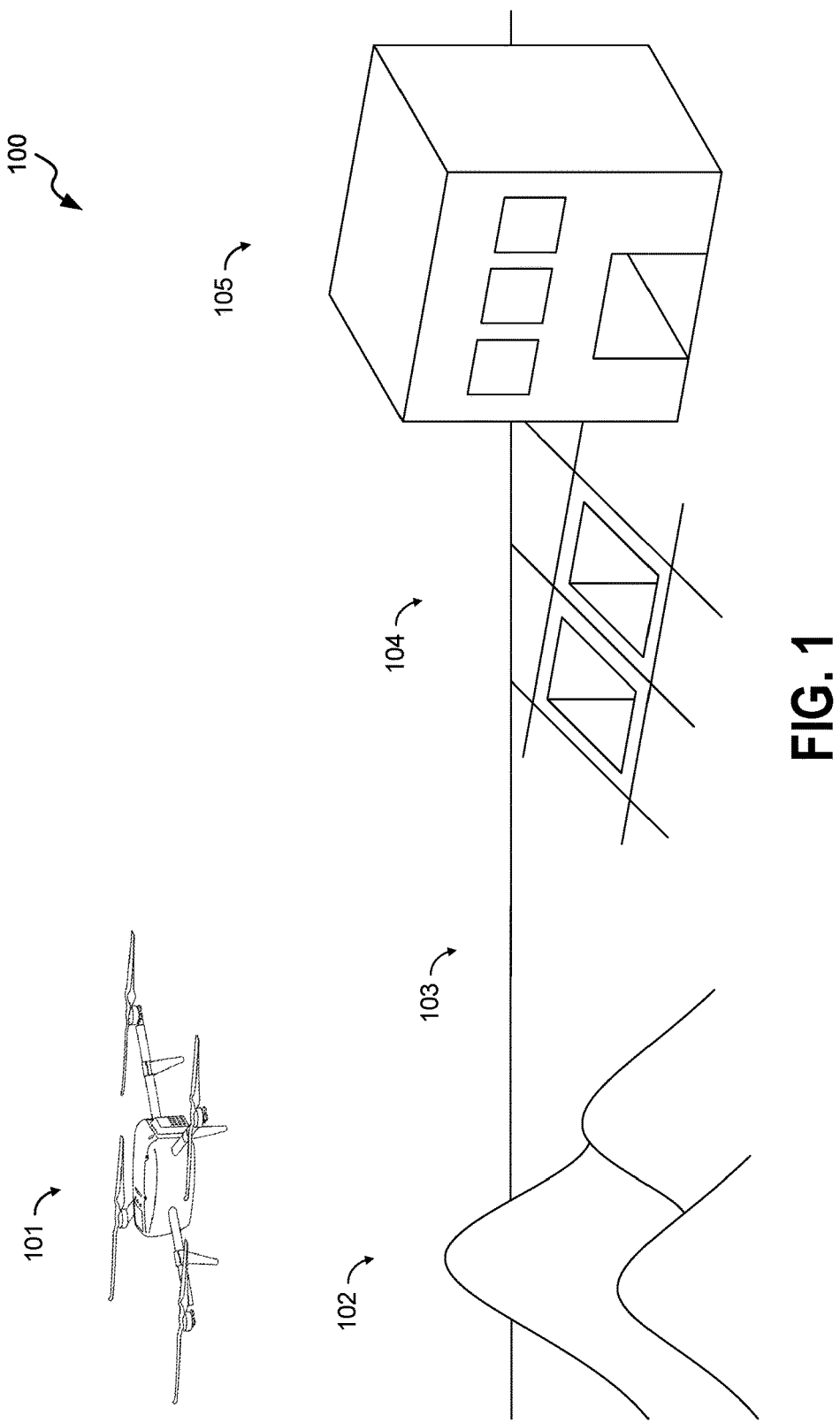
FIG. 1 is an illustration of an example of an unmanned aerial vehicle in operation according to one embodiment.

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass apparatus and/or methods which are practiced using structure and/or functionality in addition to or different than the various aspects set forth herein. It should be understood that any aspect disclosed herein might be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The term "autonomous vehicle" or "semi-autonomous vehicle," as used herein, generally refers to a vehicle that is configured to operate without substantial or any involvement from an on-board operator (e.g., a driver or pilot). An "unmanned aerial vehicle," or "UAV," as used herein, can denote a type of autonomous or semi-autonomous vehicle whose physical operational capabilities include aerial travel or flight. Such a vehicle may execute pre-programmed travel instructions rather than receive travel commands wirelessly from an operator on the ground. The pre-programmed travel instructions may define a mission that the unmanned aerial vehicle performs. Aspects of a mission may include a flight path and instructions to gather a defined set of data during the flight such as photographs or sensor measurements. An unmanned aerial vehicle can be an aircraft that is configured to take off and land on a surface. In some cases, an unmanned aerial vehicle can automatically travel from one location to another without any operator involvement. In some cases, an unmanned aerial vehicle can travel a far distance from a starting point. The distance can be far enough that the unmanned aerial vehicle cannot return to a starting point without refueling or recharging at an intermediate location. An unmanned aerial vehicle can be configured to land on a landing pad and/or charge at a charging station. In some cases, an unmanned aerial vehicle may be programmed to react to an obstacle in its path. If an obstacle is detected, the unmanned aerial vehicle may slow down, stop or change course to try to avoid the obstacle.

Topology based adaptive data gathering is disclosed herein. The term "topology," as used herein, generally refers to one or more topographical features obtained from a study of a terrain or surface using various techniques or analyses, including but not limited to geomorphometry. As an unmanned aerial vehicle executes a mission in an area, the relevant topology determined by the unmanned aerial vehicle includes the topology of the area over which the unmanned aerial vehicle flies during the mission. As described herein, in some cases, the relevant topology is that of the terrain or surface of the area immediately in the path of flight of the unmanned aerial vehicle as it approaches and eventually flies over the area in the flight path.

Payload data gathering by an unmanned aerial vehicle can be adjusted based on topological or topographical characteristics of the area of flight by the unmanned aerial vehicle. The unmanned aerial vehicle collects payload data over an area and may scale up the rate of payload data gathering or slow down the flight as the unmanned aerial vehicle flies over a high or complex structure. Conversely, the unmanned aerial vehicle may advantageously scale down the rate of payload data gathering or speed up the flight as the unmanned aerial vehicle flies over a simple structure or an empty area.

FIG. 1 is an illustration of an example of an unmanned aerial vehicle in operation according to one embodiment. The illustrated scene 100 in FIG. 1 shows an unmanned aerial vehicle 101 operating over one or more areas having various physical conditions including one or more piles of objects 102, an inconspicuous or unoccupied space 103, a below-ground structure 104, and an above-ground structure 105. It is to be noted that the items depicted in FIG. 1 are not to scale. Further details of the unmanned aerial vehicle 101 are described in connection with FIG. 2 below. The piles of objects 102 can be, for example, a pile of rocks, sand, minerals, etc. that can be useful, collected, or discarded materials and that often exist near or at sites of construction, excavation, or other similar terrestrial operations, developments, or projects. The unoccupied space 103 can be a relatively flat area having a relatively little change of altitude and/or slow rate of change of altitude (e.g., smooth), for example, such as a flat desert-like area, a meadow, a field on a mildly rolling hill, a pre-construction empty lot, and the like, from which much data need not be gathered for the purpose of the mission performed by the unmanned aerial vehicle 101. The below-ground structure 104, can be an, such as a well, a tunnel, an excavation hole, and the like, or a below-ground condition created at least in part naturally. The above-ground structure 105 can be an artificial or man-made above-ground structure, such as a building, a house, a tower, a bridge, an antenna, etc., or an above-ground condition created at least in part naturally.

One of various types of missions performed by the unmanned aerial vehicle 101 can be payload data gathering, payload data including images (two- or three-dimensional), sounds, video, and other characteristic data of one or more objects, structures, or attendant conditions within an area covered by the mission. For example, the unmanned aerial vehicle 101 can be assigned to collect payload data in the illustrated scene 100 to generate a three-dimensional image of an area in the scene 100. As the unmanned aerial vehicle 101 flies over the piles of objects 102, the unoccupied space 103, the below-ground structure 104, and the above-ground structure 105, the unmanned aerial vehicle 101 can adjust its rate of data gathering based on the physical characteristics or the topology of the scene 100. For instance, the unmanned aerial vehicle 101, for example can determine that it is approaching the above-ground structure 105 (e.g., building) using its distance detector using technologies such as LIDAR. As the unmanned aerial vehicle 101 approaches the above-ground structure 105, the unmanned aerial vehicle 101 may scale up the rate at which it receives, processes, and/or generates data (e.g., taking a photo) pertaining to the above-ground structure 105. As the unmanned aerial vehicle 101 flies over the above-ground structure 105, the unmanned aerial vehicle 101 may gather aerial data at the ramped up or higher than average rate, and as the unmanned aerial vehicle 101 determines that it is moving away from the above-ground structure 105, the unmanned aerial vehicle 101 can scale down the rate of data gathering. Similarly, in other embodiments, the unmanned aerial vehicle 101 can otherwise enhance its payload data gathering activity as it flies over the above-ground structure 105. For example, the unmanned aerial vehicle 101, in response to encountering the above-ground structure 105, can slow down its flying speed and/or hover over and around the above-ground structure 105 to gather more payload data. In another instance, the unmanned aerial vehicle 101 during its mission may fly toward the unoccupied space 103, and gathering lots of data on the unoccupied space 103 may not be necessary. As the unmanned aerial vehicle 101 takes in image data and/or gathers distance data, it can determine that it is approaching an empty lot, for example, and reduce the rate of data gathering.

The rate of data gathering and processing can be varied further depending on additional factors. For example, in some embodiments, the unmanned aerial vehicle 101 may determine based on the detected topology, that the object or the surrounding it is approaching is not of interest to the mission it is performing. In some missions, for example, detailed information pertaining to only buildings of a certain size or above is relevant, and accordingly, the unmanned aerial vehicle 101 may not increase its rate of data gathering when it determines it is approaching a small house. Similarly, in some missions, detailed information pertaining to only piles of rocks may be relevant, and the unmanned aerial vehicle 101 performing those missions may not increase its rate of data gathering as it approaches to a building. In other embodiments, the relevance of an object or surroundings can be a matter of degree such that the rate of data gathering can be increased or decreased based on the varying degrees or levels of interest in a mission. In yet another embodiments, the unmanned aerial vehicle 101 may have one or more default modes of data gathering depending on generic features, such as size, height, volume, etc., of the one or more objects or terrestrial conditions it is approaching and/or flying over. In such embodiments, particular determination of the object or condition (e.g., building vs. pile of rocks) may be only partially performed or wholly omitted.

For example, in some embodiments, the unmanned aerial vehicle 101 may determine as part of the topology determination as described herein, the shortest distance (Euclidian) between itself and the closest point on the surface of a terrestrial structure or condition. In such embodiments, the shortest distance being below a threshold, for example, may trigger the unmanned aerial vehicle 101 to ramp up the rate of payload data gathering (e.g., image taking) as the short distance may signify the terrestrial structure or condition be closer to the unmanned aerial vehicle 101 and higher from the ground than otherwise. In another example, as part of the topology determination, the unmanned aerial vehicle 101 may determine the rate of change in the shortest distance between itself and the terrestrial structure or condition. In this example, the rate of change being higher than a threshold may trigger the unmanned aerial vehicle 101 to ramp up the rate of payload data gathering as such rate of change in the shortest distance may indicate the unmanned aerial vehicle 101 approaching the structure or condition fast. In yet another example, as part of the topology determination, the unmanned aerial vehicle 101 may determine the height of the terrestrial structure (e.g., building) from a reference level (e.g., ground, sea level, etc.). In this example the height of the structure being higher than a threshold can trigger the unmanned aerial vehicle 101 to ramp up the rate of payload data gathering. In yet another example, the unmanned aerial vehicle 101 may, as part of the topology determination, identify a particular structure or particular type of structure, object, or features of interest. In such instances, the unmanned aerial vehicle 101 may ramp up the rate of payload data gathering regarding the particular structure, object, or features of interest regardless of the distance, approaching speed, or height of the structure, object, or features. In this example image data, including the payload data themselves, can be used for the identification in conjunction with other sensor data (e.g. distance data). In all these examples, the payload data gathering ramp up can be replaced with or employed in conjunction with slowing down the vehicle 101 itself.

Conversely, in other instances, the unmanned aerial vehicle 101 may determine as part of the topology determination that the particular area that it is about to fly over is not conspicuous or mostly empty. In some embodiments the unmanned aerial vehicle 101 may have a default rate of payload data collection, and when encountered with a particularly inconspicuous segment of a flight, the unmanned aerial vehicle 101 may ramp down the rate of payload data collection. In these converse examples, the payload data gathering ramp down can be replaced with or employed in conjunction with speeding up the vehicle 101 itself.

When the unmanned aerial vehicle 101 determines the relevant topology as disclosed herein, the one or more processors in the vehicle 101 may generate an instruction to adjust the payload data gathering accordingly (e.g., ramp up, ramp down) and/or adjust the speed of the vehicle 101 (e.g., slow down, speed up). Further details of such instructions are discussed in connection with FIG. 2 below.

As described herein, the data gathering can be dynamically adjusted based on the objects or surroundings the unmanned aerial vehicle 101 encounters during its mission. In some embodiments, parts or all of the process of data gathering (sensing, sampling, processing, storing, etc.) can be dynamically adjusted to, for example, reduce complexity in some parts of data gathering (e.g., keeping the sensors constantly on for simplicity) while adjusting other parts of data gathering (e.g., dynamically adjusting the sampling rate according to the topology of the ground object). Adjusting data gathering based on topology as disclosed herein can be advantageous because it allows gathering detailed data on objects or surroundings of complicated topology while reducing relatively less important or redundant data gathering on simple or inconspicuous surroundings. The dynamic adjustment in data gathering allows reducing of overall data, which can be beneficial for storage and data transfer purposes without much, if any, compromise in the quality of overall data gathered for the mission.

Furthermore, it can be advantageous to, for example, take in more payload data such as pictures of a big structure, such as a tall building, to ameliorate potential loss of or variations in resolution due to the close or varying distance of the building (especially the top portions of the building) to the flight path of the unmanned aerial vehicle 101. In other instances, it can be advantageous to gather additional data due to the complex, unpredictable, or unique nature of certain structures or objects (e.g., statues, bridges, towers, random piles of objects, etc.) in the three-dimensional space below the flight path of the unmanned vehicle 101. On the contrary, if the space below the unmanned aerial vehicle 101 is relatively flat, empty, or otherwise inconspicuous or predictable, not much data of the space may be necessary and gathering data at a relatively low rate allows the unmanned aerial vehicle 101 to save power, memory, storage capacity, and data transmission bandwidth in its operation. In such case, the unmanned aerial vehicle 101 can be configured to take, for example, the least number of pictures of the area that will allow generation of a three-dimensional map without more. For instance, depending on the implementation of the disclosed herein, the volume of data transfer can be reduced by 50% while maintaining the overall resolution or quality of a map generated from the images taken by the unmanned aerial vehicle 101.

Figure 2:
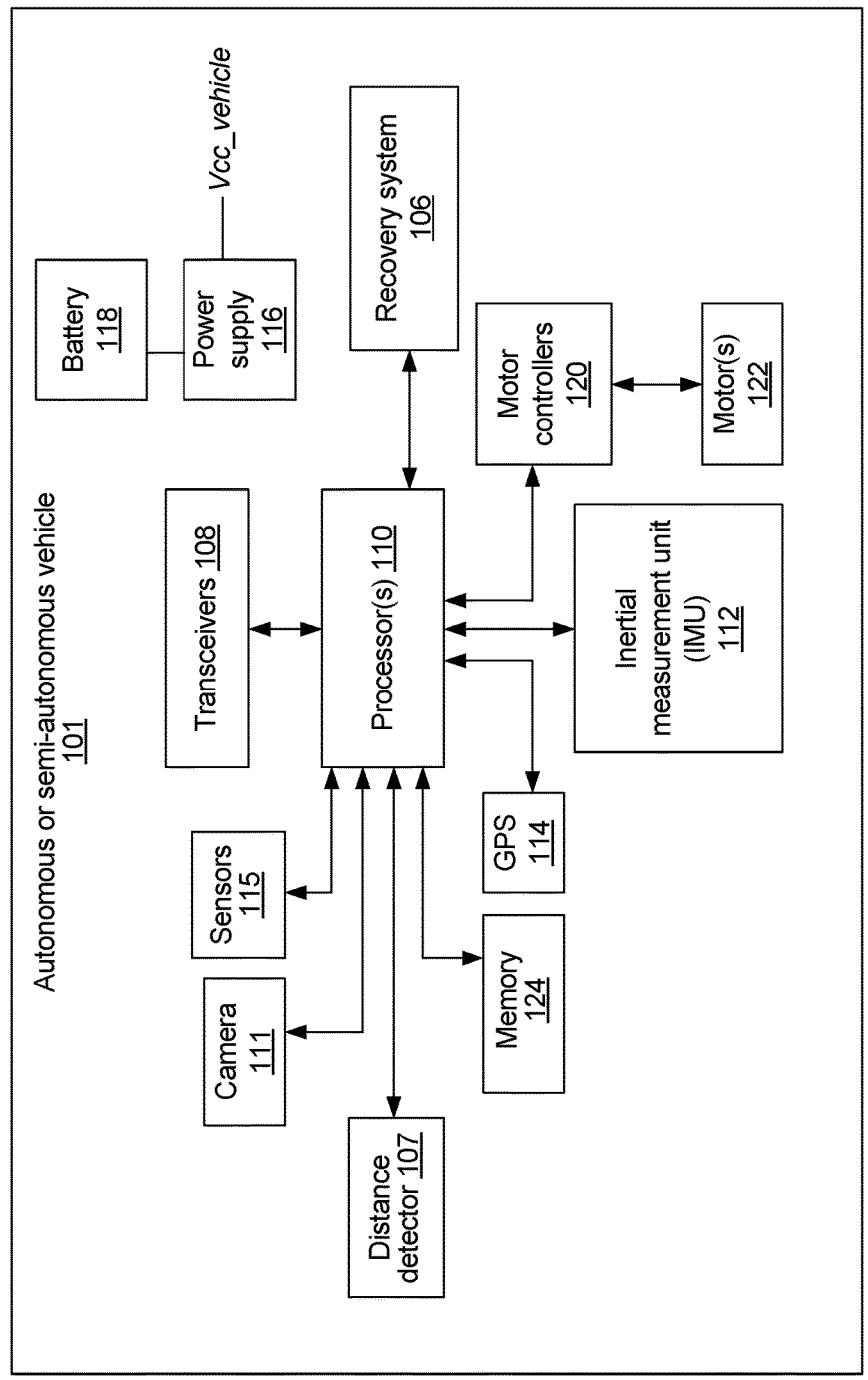
FIG. 2 is an example unmanned aerial vehicle according to one embodiment.

FIG. 2 is a diagram showing components of an example unmanned aerial vehicle according to one embodiment. The vehicle 101 illustrated in FIG. 2 includes one or more processor(s) 110 in communication with a state estimator which may be an inertial measurement unit (IMU) 112. The processor 110 is in further communication with one or more transceivers 108, sensors 115, a distance detector 107, a camera 111, a global positioning system (GPS) module 114, memory 124, and motor controllers 120, which are in communication with motors 122. The vehicle 101 further includes a power supply 116 and a battery 118, which provides power to one or more modules of the vehicle 101, including the processor 110. The transceivers 108 and the GPS module 114 may be in further communication with their respective antennas (not shown). The memory 124 may store one or more of mission instructions, travel instructions, pre-mission routines, payload data, flight data and/or telemetry, settings, parameters, or other similarly relevant information or data. The vehicle 101 may also include a recovery system 106, which may be in communication with one or more components in the vehicle 101, including the processor 110. In some embodiments, the recovery system 106 may include a dedicated recovery processor (not shown) in communication with a recovery state estimator (not shown), which may also be an additional IMU (not shown). The vehicle 101 may include additional or intermediate components, modules, drivers, controllers, circuitries, lines of communication, and/or signals not illustrated in FIG. 2.

The vehicle 101 can perform its regular operation according to instructions executed by the processor 110 to, for example, take a course of action for a mission. The processor 110 can be a microprocessor capable of communicating with various modules illustrated in FIG. 2 executing instructions pre-programmed and/or received during a mission, for example. The processor 110 may receive settings, values, or parameters stored in the memory 124 and data from the sensors 115, the distance detector 107, the camera 111, the transceivers 108, the GPS module 114, the IMU 112, and the motor controllers 120 to evaluate the status of the vehicle 101 and determine a course of action. The status of the vehicle 101 can be determined based on data received through the sensors 115, the distance detector 107, and/or preloaded data stored in the memory 124 and accessed by the processor 110. For example, the altitude of the vehicle 101 above ground can be determined by the processor 108 based on a digital elevation model (DEM) of a world elevation map or with the distance detector 107 (e.g., a LIDAR), a barometer, or ultrasound. In some embodiments, the vehicle 101 may include multiple processors of varying levels of computing power and reliability to execute low-level instructions or run high-level application code or a virtual machine. In such embodiments, one or more of the functionalities of the processor(s) 110 described herein may instead be performed by another processor in the vehicle 101.

The transceivers 108 can be devices capable of transmitting and receiving data to and from a system, device, or module external to the vehicle 101. For example, the transceivers 108 may include radio frequency (RF) transceivers capable of communicating data over a Wi-Fi network or any other suitable network in various frequency bands or channels, such as 900 MHz, 2.4 GHz, 5 GHz, etc. In some embodiments, the transceivers 108 may be implemented with a combination of separate transmitters and receivers. The motor controllers 120 may include a controller device or circuit configured to interface between the processor 110 and the motors 122 for regulating and controlling speed, velocity, torque, or other operational parameters of their respective, coupled motors 122. In some embodiments, one or more motor control schemes, such as a feedback control loop, may be implemented with the processor 110 and/or the motor controllers 120. The motors 122 may include electrical or any other suitable motors coupled to their respective rotors of the vehicle 101 to control their propellers, for example.

The memory 124 can be a memory storage device (e.g., random-access memory, read-only memory, flash memory, or solid state drive (SSD) storage) to store data collected from the sensors 115, the camera 111, data processed in the processor 110, or preloaded data, parameters, or instructions. In some embodiments, the memory 124 may store data gathered from the distance detector 107 using various computationally efficient data structures. For example, in some cases, the distance data from the distance detector 107 can be stored using a three-dimensional occupancy grid mapping, with the gathered data grouped into cube-shaped bins of variable resolution in space. Depending on the need of distance data for the various processes or operations described herein using distance data, the resolution of the occupancy grid can be determined to indicate whether each variable resolution bin within the reach of the distance detector is free or occupied based on the gathered distance data. In some embodiments, the three-dimensional occupancy mapping values can be estimated using probabilistic approaches based on the gathered distance data. Furthermore, such three-dimensional occupancy grid mapping can aid or be part of the dynamic or adaptive topology based data gathering as disclosed herein.

The IMU 112 may include a stand-alone IMU chip containing one or more magnetometers, gyroscopes, accelerometers, and/or barometers. In some embodiments, the IMU 112 may be implemented using a combination of multiple chips or modules configured to perform, for example, measuring of magnetic fields and vehicle orientation and acceleration and to generate related data for further processing with the processor 110. Regardless of integrated or multi-module implementation of the IMU 112, the term "magnetometer" as used herein, generally refers to the part(s) of the IMU 112 responsible for measuring the magnetic field at the location of the vehicle 101. Similarly, the term "accelerometer" as used herein, generally refers to the part(s) of the IMU 112 responsible for measuring acceleration of the vehicle 101, and the term "gyroscope" as used herein, generally refers to the part(s) of the IMU 112 responsible for measuring orientation of the vehicle 101.

The recovery system 106 can be responsible for recovery operation of the vehicle 101 to, for example, safely deploy a parachute and land the vehicle 101. The recovery system 106 may include a parachute (not shown) and an electromechanical deployment mechanism (not shown). The power supply 116 may include circuitry such as voltage regulators with outputs directly powering various modules of the vehicle 101 with Vcc_vehicle, and the battery 118 can provide power to the power supply 116. In some embodiments, the battery 118 can be a multi-cell lithium battery or any other suitable battery capable of powering the vehicle 101. In some embodiments, the battery 118 of the vehicle 101 can be removable for easy swapping and charging.

The sensors 115 may include one or more proximity sensors using, for example, infrared, radar, sonar, ultrasound, LIDAR, barometer, and/or optical technology. The sensors 115 may also include other types of sensors gathering data regarding visual fields, auditory signals, and/or environmental conditions (e.g., temperature, humidity, pressure, etc.). The GPS module 114 may include a GPS transceiver and/or a GPS driver configured to receive raw and/or processed GPS data such as ephemerides for further processing within the GPS module 114, with the processor 110, or both. The vehicle 101 may also include a microphone (not shown) to gather audio data. In some embodiments, one or more sensors 115 responsible for gathering data regarding auditory signals can take the place of the microphone.

The distance detector 107 can include a LIDAR sensor, such as a one-, two-, or three-dimensional LIDAR sensor. In some embodiments, the distance detector 107 can be accompanied by one or more support structures or mechanical mechanisms for improving, augmenting, or enhancing its detectability. Also, in some embodiments, the distance detector 107 can be mounted on a strategic location of the vehicle 101 for ease of detection and control.

The camera 111 can be configured to gather images and/or video. In some embodiments, one or more of the sensors 115 and the distance detector 107 responsible for gathering data regarding visual fields can take the place of the camera 111. In some embodiments, the sensors 115, the distance detector 107, and/or the camera 111 may be configured to gather parts of payload data, which includes data gathered by the vehicle 101 regarding its surroundings, such as images, video, and/or processed 3D mapping data, gathered for purposes of mission performance and/or delivered to the user for various purposes such as surveillance, inspection, monitoring, observation, progress report, landscape analysis, etc. The sensors 115 may also gather what may be termed telemetry data, which is data regarding the status and activities of the vehicle 101 during the flight such as velocity, position, attitude, temperature, and rotor speeds. Such data may be collected to retain records or logs of flight activity and perform diagnostics. In some embodiments, the sensors 115, the distance detector 107, and/or the camera 111 may also be configured to gather data for purposes of aiding navigation and obstruction detection.

As discussed above, one or more of the sensors 115, the camera 111, and the distance detector 107 can be configured to receive, process, and/or generate data at a dynamic or adaptive rate in response to the physical characteristics of the object or field of interest, such as the topology of a designated area. For instance, the distance detector 107 of the unmanned aerial vehicle 101 can detect that the vehicle 101 is approaching a building (the above-ground structure 105 in FIG. 1), which is of interest to the mission, and the camera 111 may gradually increase the rate at which the camera 111 takes pictures of the building. The unmanned aerial vehicle 101 can further adjust the speed of the flight through the motor controllers 120, for example, over and around the building to allow more pictures to be taken by the camera 111.

Figure 3:
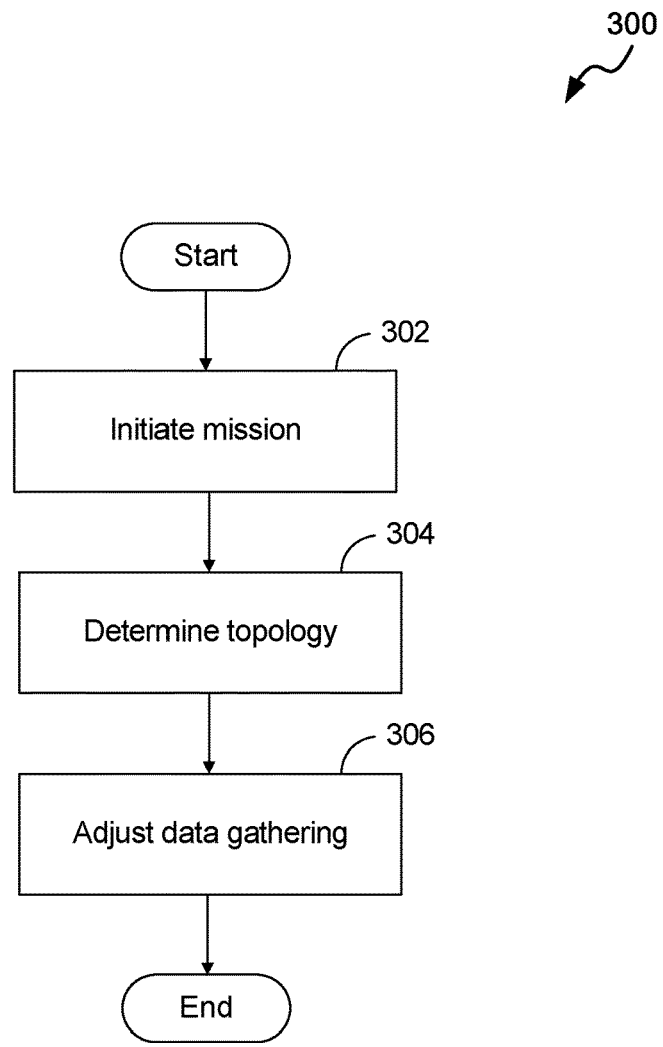
FIG. 3 is a flowchart of an example data gathering of an unmanned aerial vehicle.

FIG. 3 is a flowchart of an example data gathering of an unmanned aerial vehicle. The illustrated process 300 can be performed in part by and/or in conjunction with one or more components in the vehicle 101 (FIG. 2), such as the processor(s) 110 (FIG. 2), the distance detector 107 (FIG. 2), the sensors 115 (FIG. 2), the camera 111 (FIG. 2), the memory 124 (FIG. 2), the GPS module 114 (FIG. 2), the IMU 112 (FIG. 2), and the motor controllers 120 (FIG. 2). It is to be noted that all or parts of steps 302, 304, and 306 may be concurrently, continuously, periodically, intermittently, repeatedly, or iteratively performed, and the illustrated process in FIG. 3 is only one example embodiment of inventive features disclosed herein.

In step 302, the unmanned aerial vehicle 101 initiates the mission. In some embodiments, the mission or part of the mission may be to gather images of a predefined area to generate a two- and/or three-dimensional map. In other instances, the mission may involve gathering and generating other types of data pertaining to the physical characteristics of the objects or structures the unmanned aerial vehicle 101 flies over, such as identifying certain objects or interest and determining physical conditions of the objects of interest.

In step 304, using various components described in connection with FIG. 2 above, the unmanned aerial vehicle 101 may determine the topology of the area it flies over. In some embodiments, the unmanned aerial vehicle 101 may gather distance data of its surroundings at a default rate using the distance detector 107 to determine if certain physical conditions are present. For instance, a wall of a tall building may result in a quick change in distance from the vehicle 101 to its surroundings, and a pile of sand can result in a gradual smooth change in distance from the vehicle 101 to its surroundings.

In step 306, the unmanned aerial vehicle 101 may adjust its data gathering as a significant or otherwise meaningful change in topology is determined. In some embodiments, the adjustment in data gathering can be gradual, and in other embodiments, the adjustment of data gathering can be bimodal or discrete. In some embodiments, the adjustment of data gathering can be based on identification of the object or structures based on the topology determination. For instance, the unmanned aerial vehicle 101 may be configured to double its rate of data gathering when it encounters a building while it can be configured to triple the rate when it approaches a pile of rocks. Also, in some embodiments, the adjustment in data gathering my further involve adjusting the flying speed, for example, to allow more time for data gathering. In some embodiments, the dynamic adjustment of data gathering can be only partially implemented to balance the adaptability of the data gathering system and simplicity in implementation.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An unmanned aerial vehicle comprising:
   a camera configured to generate photographic images;
   one or more sensors configured to generate sensor data; and
   one or more processors configured to:
   during a flight, estimate topology along at least a portion of a flight path based at least in part on the generated sensor data;
   detect a change in the estimated topology; and
   change the rate at which photographic images are generated and/or processed based at least in part on the detected change in the estimated topology.

2. The unmanned aerial vehicle of claim 1, wherein the one or more sensors comprise a distance detector.

3. The unmanned aerial vehicle of claim 1, wherein the change in estimated topology indicates approaching an above-ground structure, and wherein the rate at which photographic images are generated and/or processed is increased.

4. The unmanned aerial vehicle of claim 1, wherein the generated sensor data is indicative of the unmanned aerial vehicle flying away from an above-ground structure, and wherein the rate at which photographic images are generated and/or processed is decreased.

5. The unmanned aerial vehicle of claim 1, wherein the sensor data comprise distance data between the unmanned aerial vehicle and one or more ground structures in the flight path, and wherein the estimated topology is based at least in part on a shortest distance between the unmanned aerial vehicle and the one or more ground structures.

6. The unmanned aerial vehicle of claim 5, wherein the photographic images are generated and/or processed at at least three different rates during the flight.

7. The unmanned aerial vehicle of claim 1, wherein the one or more processors are configured to follow instructions to execute a mission, wherein the change in estimated topology comprises detecting an object of interest of the mission, and wherein the rate at which photographic images are generated and/or processed is increased.

8. The unmanned aerial vehicle of claim 1, wherein the one or more processors are configured to estimate the topology based at least in part on one or more of the photographic images.

9. The unmanned aerial vehicle of claim 1, wherein the one or more processors are further configured to change the velocity of the unmanned aerial vehicle based at least in part on the changed topology.

10. An unmanned aerial vehicle comprising:
    one or more sensors configured to generate sensor data and payload data;
    memory storing the payload data;
    one or more processors configured to:
    estimate topology along at least part of a flight path based at least in part on the sensor data; and
    adjust the rate at which payload data is generated based at least in part on the estimated topology.

11. The unmanned aerial vehicle of claim 10, wherein the one or more sensors comprise a distance detector.

12. The unmanned aerial vehicle of claim 10, wherein the payload data comprises a plurality of images.

13. The unmanned aerial vehicle of claim 10, wherein the one or more processors are configured to estimate the topology along at least part of the flight path based at least in part on at least some of the payload data.

14. The unmanned aerial vehicle of claim 10, wherein adjusting the rate of payload data generation comprises adjusting resolution of acquired images.

15. An unmanned aerial vehicle comprising:
    one or more sensors configured to generate payload data and sensor data;
    memory storing the payload data; and
    one or more processors configured to:
    during a flight, estimate a topology along at least a portion of a flight path based at least in part on the generated sensor data;
    detect a change in the estimated topology; and
    change a velocity of the unmanned aerial vehicle based at least in part on the detected change in the estimated topology.

16. The unmanned aerial vehicle of claim 15, wherein changing the velocity comprises reducing speed.

17. The unmanned aerial vehicle of claim 15, wherein the one or more sensors comprise a camera.

18. The unmanned aerial vehicle of claim 17, wherein the one or more sensors further comprise a distance detector.

19. A method of adaptive data gathering for an autonomous aerial vehicle comprising:
    generating sensor data;
    generating payload data;
    storing the payload data;
    estimating a topology along at least a portion of a flight path based at least in part on the sensor data; and
    adjusting the generation of payload data based at least in part on the estimated topology so as to reduce a total size of the stored payload data.

20. The method of claim 19, wherein the sensor data comprise distance data between the unmanned aerial vehicle and one or more ground structures in the flight path.

21. The method of claim 19, wherein the estimated topology comprises a shortest distance between the autonomous aerial vehicle and the one or more ground structures.

* * * * *